Figure 1:
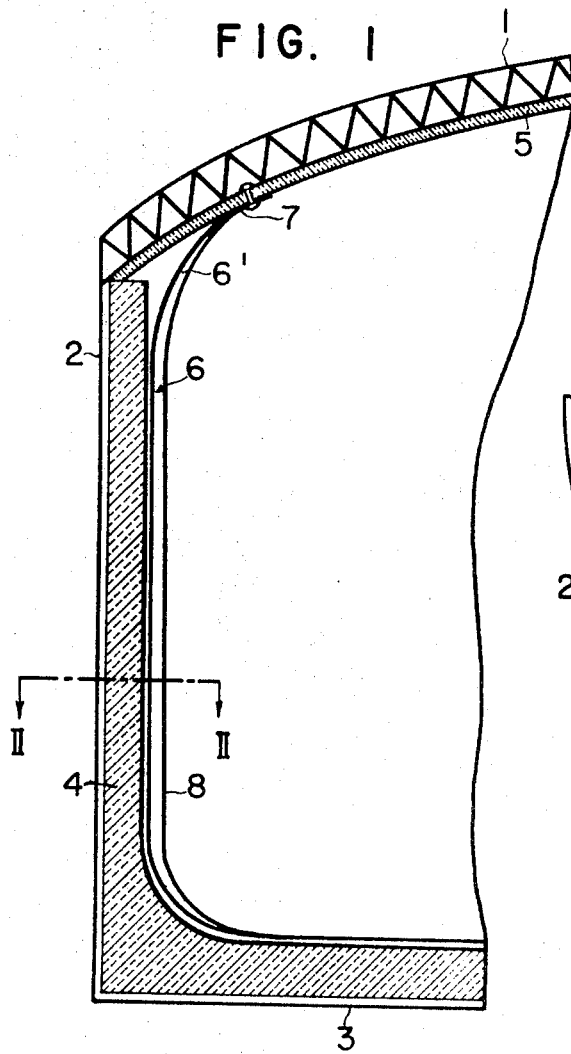

United States Patent

[11] 3,595,066

| [72] | Inventor | Katsuro Yamamoto<br>Tokyo, Japan |
| --- | --- | --- |
| [21] | Appl. No. | 873,362 |
| [22] | Filed | Nov. 3, 1969 |
| [45] | Patented | July 27, 1971 |
| [73] | Assignee | Bridgestone Liquefied Gas Company Limited<br>Tokyo, Japan |
| [32] | Priority | Nov. 4, 1968 |
| [33] | | Japan |
| [31] | | 43/80268 |

[54] METHOD OF HYDROSTATICALLY TESTING A STORAGE TANK FOR LOW TEMPERATURE LIQUEFIED GASES
3 Claims, 3 Drawing Figs.

| [52] | U.S. Cl. | 73/37 |
| --- | --- | --- |
| [51] | Int. Cl. | G01m 3/02 |
| [50] | Field of Search | 73/37, 40, 40.5, 49.2 |

[56] References Cited
UNITED STATES PATENTS

| 2,041,450 | 5/1936 | Adams | 73/40 |
| --- | --- | --- | --- |
| 2,222,079 | 11/1940 | Larson | 73/37 |
| 2,762,736 | 9/1956 | Beuglet | 73/40 X |
| 3,490,268 | 1/1970 | Hand et al. | 73/40 |

*Primary Examiner*—Louis R. Prince
*Assistant Examiner*—William A. Henry, II
*Attorneys*—Robert E. Burns and Emmanuel J. Lobato

ABSTRACT: A method for hydrostatically testing storage tanks for liquefied gases of the type having an inner suspended membrane upstanding corrugations. The corrugations extending outwardly of the inner tank are supported by the outer tank but the innerwardly extending corrugations are supported during the test with resilient air-filled hoses closed at the lower end and interposed between the outer tank and the outer tank. The hoses are spaced circumferentially of the inner tank and vertically in the spaces between an outer tank insulating liner and the inwardly extending corrugations.

METHOD OF HYDROSTATICALLY TESTING A STORAGE TANK FOR LOW TEMPERATURE LIQUEFIED GASES

The present invention relates generally to membrane storage tanks and more particularly to a method applying a water pressure test to a membrane tank for use in storing a low temperature liquefied gas.

In known membrane tanks of the type in which an inner tank or vessel made of a thin metallic film or sheet is suspended from the top of an outer tank the inner tank has corrugations formed vertically on the sidewall thereof. When any low temperature liquefied gas is supplied within the storage tank and the liquid pressure acts thereupon, that is, under the low temperature loaded condition, the corrugations are stretched out and the sidewall of the inner vessel assumes an almost flat condition relative to and in contact with the surface of a heat insulating liner of the outer tank.

Generally these storage tanks must be subjected to a water pressure test prior to their use in order to confirm the degree of strength thereof. In practice, this water pressure or hydrostatic test is applied at an ordinary ambient temperature. In the membrane tank in accordance with the present invention the membrane is made so that vertical corrugations formed on the sidewall of the inner vessel are stretched out flat or even contact the outer tank liner at low temperature. That is, the peripheral length of the sidewall of the inner vessel is made so that it is longer, at an ordinary temperature by the amount of contraction due to the thermal change of the inner vessel when in use, than that of the inner peripheral surface of a heat insulating layer or liner of the outer tank. Thus, this surplus length of the sidewall of the inner vessel forms the corrugations.

Accordingly with a membrance tank of the suspended type, under a low temperature loaded condition, the above-mentioned corrugations disappear because of the contraction of the inner vessel, and at the same time the sidewall of the inner vessel assumes a flat or even contact with the inner surface of the heat insulating liner and the internal pressure on the storage tank is supported or received by the outer vessel which has a rigid fluidtight construction. This support is completely peripherally of the inner tank so that no substantial overstress can be applied to the inner vessel when in use. But in the case where a water pressure test is applied at an ordinary temperature, that is, under the ordinary ambient temperatures in a loaded or filled condition, the corrugations formed on the sidewall of the inner vessel remain unchanged as contraction of the inner vessel due to thermal changes does not take place and then there is a risk of producing an unsatisfactory plastic deformation of the inner vessel by the collapse of these corrugations due to the applied water pressure.

Thus a principal object of the present invention is to provide a method of applying a water pressure test on a membrane tank of the suspended type, used in storing low temperature liquefied gas, in an effective manner while preventing collapse of the corrugations in the inner membrane vessel due to water pressure.

In the method according to the inwardly extending corrugations of the inner vessel are supported by confining air under pressure in inflatable elongated, hoselike members sealed off at one end. These hoselike members assume a flattened condition in a deflated condition and are readily inserted vertically between the inner tank and the heat insulating liner of the outer tank peripherally spaced in positions in the spaces formed between the inner tank inwardly extending corrugations and the lever. Thus, the supports in an inflated condition are in registry with the areas of the inner tank needing support during the hydrostatic test and a sufficient number of the inflated supports are used in each space so that each of the inwardly extending corrugations is supported substantially across its full width.

Figure 2:
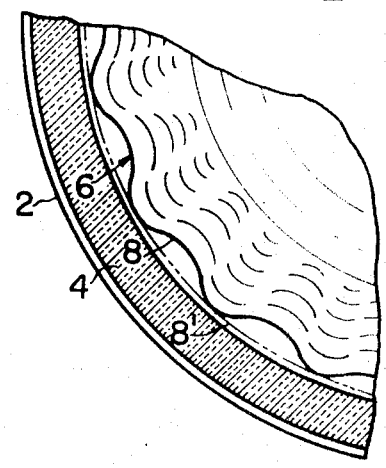
Figure 3:
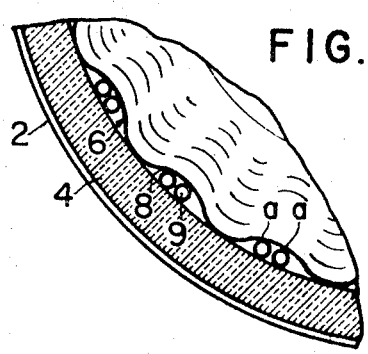

For a better understanding of this invention, reference will be made to the accompanying drawings, in which FIG. 1 is a fragmentary section elevation view illustrating the principal parts of membrance tank of the suspended type for use in storing a low temperature liquefied gas;

FIG. 2 is a horizontal section view taken along section line II-II of FIG. 1, and FIG. 3 is the same cross section view as FIG. 2 illustrating the method of the water pressure test according to the present invention.

Referring more particularly to the drawings, FIG. 1 illustrates a membrance tank of the suspended type, for use in storing a low temperature liquefied gas, and which is to be subjected to a water pressure test according to the present invention. This storage tank is what is called a "membrane tank" in which a heat insulating liner having a compression resistant property is provided inside an outer vessel having a rigid fluidtight construction, and inside of the heat insulating liner is provided an inner vessel made of a fluidtight thin film. That is, the innermost vessel is of a membranous construction so that liquid within the inner vessel can be prevented from any leakage and the internal pressure on the storage tank can be supported or received by the outer vessel having a rigid fluidtight construction.

The tank in FIG. 1 has a top wall 1, a sidewall 2 and a bottom wall 3, respectively, of an outer vessel. The outer vessel has a rigid fluidtight construction and can withstand the internal pressure on the storage tank when filled with a liquid gas. A heat insulating liner or layer 4 is provided and is composed of heat insulating material having a compression resistant property such as perlite concrete or rigid foamed polyurethane. Another heat insulating material layer 5 is installed on the undersurface of the top wall of the outer vessel and it need not have a compression resistant property. An inner vessel 6 is made of thin metallic sheet, and comes into close contact with the surface of the above-mentioned wall heat insulating liner 4 by deflection thereof caused by internal pressure when filled with liquid gas. An upper peripheral portion of the inner vessel 6 is formed as a curved portion 6' and the upper end or marginal portion 7 thereof is fixed to the top wall 1 of the outer vessel. Therefore, the inner vessel 6 is constructed so as to be suspended from the top wall of the outer vessel at the upper end 7 of the inner vessel 6 so that contraction in a vertical direction due to thermal change within the vertical wall of the inner vessel is absorbed by the change of curvature of the curved portion 6'.

In order to absorb contraction due to thermal change in the circumferential and horizontal direction the inner vessel 6 has corrugations or cambers 8 formed vertically on the sidewall thereof. These corrugations 8 are deflected outwardly in use under the low temperature loaded condition, and become flat and even contact the wall heat insulating layer 4, as shown by a chain line 8' in FIG. 2 due to thermal change and the expansion effect caused by liquid pressure. The internal pressure in the inner vessel of the storage tank is transmitted to the sidewall 2 of the outer vessel through the sidewall heat insulating layer 4, and thus scarcely any bending or tensile force, which would damage the inner vessel itself, acts thereupon.

According to the invention a hydrostatic test is applied to the tank without damage to the corrugations of the inner membrance vessel or tank as hereinafter explained. Since there is no contraction due to thermal change at the time of application of the water pressure test at an ordinary ambient temperature, the peripheral or circumferential length of the sidewall of the inner tank is comparatively longer than that of the wall heat insulating layer 4 so that the corrugations of the inner tank do not disappear. And when the water pressure acts upon the inner part of this corrugated sidewall not bearing on the insulating layer, the inner vessel is damaged by the phenomenon of collapse. That is, the storage tank, which would have no trouble at all in practical use, will be destroyed by the water pressure test unless the method of the invention is employed.

Therefore, according to the present invention inflatable, resilient hoselike supports 9 are interposed or placed in advance in the individual spaces formed between the corrugations 8 and the inner surface of the sidewall heat insulating layer at the time of the water pressure test of the membrane tank at an ordinary ambient temperature, see FIG. 3. The supports 9 are rubber hoses in which air at a certain pressure is contained since the hoses are sealed off at the lower end thereof. The air pressure source is not shown but it is connected to all the individual hoses. The hoses are distributed throughout the entire circumference of the inner vessel.

The hoses 9 support the corrugated portions on the sidewall of the inner vessel so there is no danger of collapse of the corrugations 8 when the water pressure test is applied. The hoses 9 have a high degree of rigidity when inflated and the bending stress at the contact areas $a$ between the corrugations 8 and the inflated elements 9 increases as the areas $a$ flex outwardly during the test.

Accordingly in the present invention, the above-mentioned resilient hoselike members are used so that the corrugations 8 can be supported in a resilient way, and thus the supported areas $a$ are given support across the full width to some extent. If the curvature of the areas $a$ due to the deformation of the hoses 9 is below the range of the allowable curvature of the bending of the inner vessel material, there is no fear of folding outwardly the inwardly extending corrugations 8 of the inner vessel.

After the water pressure test is finished, the hoses 9 become flat when the air within the hose is vented and so they can be easily pulled out outwardly. When occasion demands the flattened or deflated hoses may be left in place since this occasions no trouble with the use of the tank for the storage thereafter.

Thus, according to the method of the present invention, the water pressure test of the membrane tank of the suspended type at an ordinary ambient temperature can be effectively made without the collapse of the corrugations and thus damage to the membrane vessel is avoided.

What I claim and desire to secure by Letters Patent is:

1. A method hydrostatically testing a storage tank having an outer tank and an inner tank concentric with the outer tank, the inner tank having vertical corrugations circumferentially thereof, the method comprising, inserting vertically positioned, resilient elongated members between the outer tank and the inner tank at circumferentially spaced positions circumferentially of the inner tank in registry with spaces defined by inwardly extending corrugations of the inner tank, and thereafter filling the inner tank with a liquid at ambient temperature to a desired test level, whereby the inwardly extending corrugations are not overstressed.

2. A method according to claim 1, in which said elongated members are hollow and closed at a lower end thereof and including supplying air under pressure to said hoselike members to inflate them before filling said inner tank.

3. A method of hydrostatically testing a storage tank for low temperature liquefied gases having an outer covered tank and an inner open tank concentric with the outer tank, the inner tank being made of thin metallic sheet and having vertically extending corrugations circumferentially of the tank and having an upper marginal portion suspended from the outer tank, with water at ambient temperature to a desired level to apply a desired test pressure, and during the filling of the inner tank and the application of said test pressure supporting the outwardly extending corrugations of the inner tank with said outer tank, and before application of said test pressure confining air under pressure in inflatable, resilient supports removably disposed in peripherally spaced vertically extending spaces between the outer tank and the inwardly extending corrugations of the inner tank to resiliently support the inwardly extending corrugations of the inner tank with air under pressure confined in said resilient supports in said spaces, whereby the inner tank is not overstressed during said test.